United States Patent [19]

Ohya et al.

[11] Patent Number: 5,150,923
[45] Date of Patent: Sep. 29, 1992

[54] PLASTIC PIPE JOINT ASSEMBLY FOR JOINING SECTIONS OF PLASTIC PIPE

[75] Inventors: Hiroshi Ohya, Gifu; Takeshi Kato, Mie, both of Japan

[73] Assignee: Hitach Metals, Ltd., Tokyo, Japan

[21] Appl. No.: 467,341

[22] Filed: Jan. 22, 1990

Related U.S. Application Data

[63] Continuation of Ser. No. 209,808, Jun. 22, 1988, abandoned.

[30] Foreign Application Priority Data

| Jun. 29, 1987 | [JP] | Japan | 62-99888[U] |
| Oct. 29, 1987 | [JP] | Japan | 62-273907 |
| Oct. 29, 1987 | [JP] | Japan | 62-273908 |
| Jan. 7, 1988 | [JP] | Japan | 63-1732 |

[51] Int. Cl.$^5$ ............................................ F16L 13/02
[52] U.S. Cl. ............................................ 285/21; 285/93; 285/197; 285/423
[58] Field of Search ............ 285/93, 21, 18, 41, 285/417, 423, 197; 219/535, 544; 156/273.9, 274.2, 309.6, 294; 264/27, 36, 40.2, 230

[56] References Cited

U.S. PATENT DOCUMENTS

| 2,184,534 | 12/1939 | Smith et al. | 285/21 |
| 2,184,534 | 12/1939 | Smith et al. | 285/21 |
| 4,486,650 | 12/1984 | Bridgstock et al. | 219/544 |
| 4,684,417 | 8/1987 | Glandclement | 285/93 X |
| 4,718,698 | 1/1988 | Hill | 285/21 |
| 4,855,574 | 8/1989 | Lodder et al. | 285/21 X |
| 4,906,313 | 3/1990 | Hill | 285/21 X |
| 4,927,183 | 5/1990 | Steinmetz et al. | 285/423 X |
| 4,927,184 | 5/1990 | Bourjot et al. | 285/423 X |

FOREIGN PATENT DOCUMENTS 1440713 6/1976 United Kingdom ................ 285/21

*Primary Examiner*—Dave W. Arola
*Attorney, Agent, or Firm*—Finnegan, Henderson, Farabow, Garrett and Dunner

[57] ABSTRACT

A plastic socket pipe joint comprising a cylindrical plastic socket pipe joint body, an electric heating wire buried in the cylindrical inner surface of the plastic socket pipe joint body, and two connector pins embedded in the plastic socket pipe joint body. The lower ends of the connector pins are connected to both ends of the electric heating wire and the upper ends thereof protrude from the cylindrical outer surface of the plastic socket pipe joint body. Two recesses are formed in the plastic socket pipe joint body near the connector pins for receiving respective thermocouples. The plastic pipe joint is welded to a plastic pipe by applying current to the electric wire. The temperature of the plastic pipe joint is measured with the thermocouples so that when the temperature drops to a predetermined value, the application of current is suspended.

28 Claims, 4 Drawing Sheets

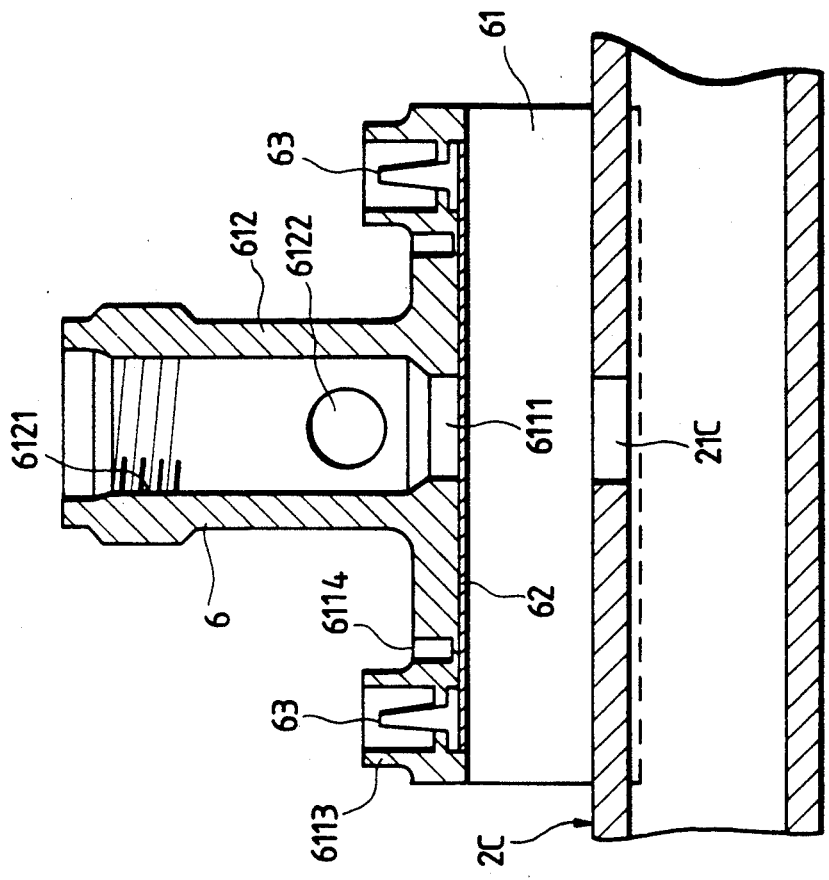
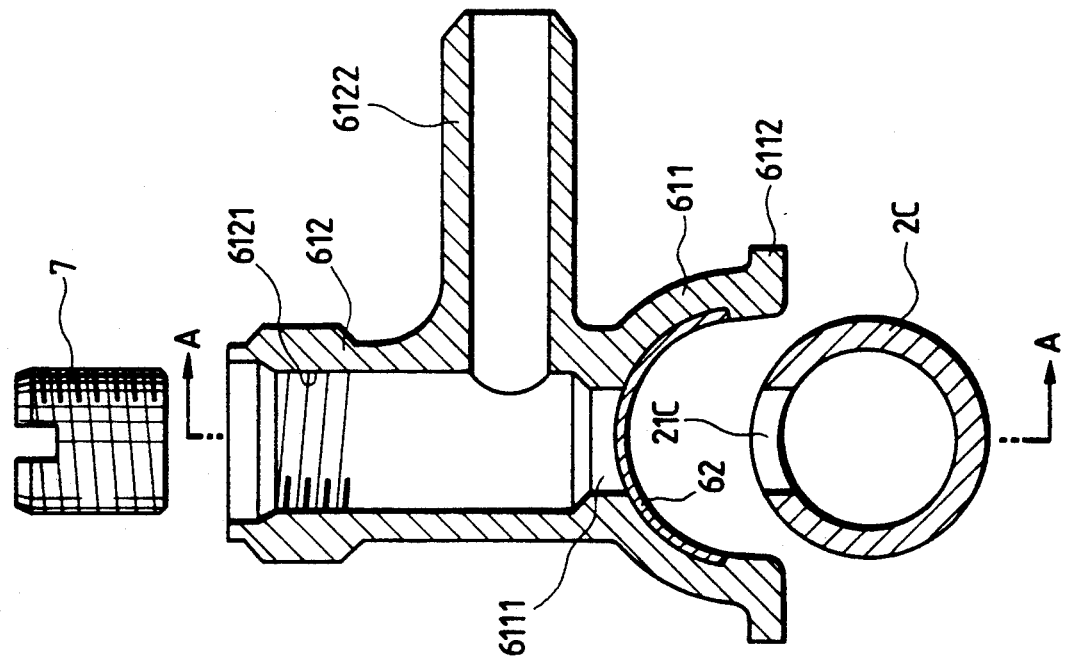

5,150,923

PLASTIC PIPE JOINT ASSEMBLY FOR JOINING SECTIONS OF PLASTIC PIPE

This application is a continuation of application Ser. No. 07/209,808, filed Jun. 22, 1988, now abandoned.

FIELD OF THE INVENTION

This invention relates to a plastic pipe assembly for joining sections of plastic pipe.

BACKGROUND OF THE INVENTION

FIG. 6 is a sectional view showing a conventional plastic pipe joint and conventional plastic pipes connected thereto. More specifically, one end portion of the plastic pipe joint 100 is connected to the plastic pipe 2A by electric fusion welding, and the other end portion is connected to the plastic pipe 2B similarly by electric fusion welding, so that the plastic pipes 2A and 2B are joined together.

The plastic pipe joint 100 comprises a pipe joint body 101, an electric heating wire 12, and two connector pins 13. The pipe joint body 101 is cylindrical and is made of plastic, and it has an annular inside rim 14, which protrudes from the inner wall at the middle of the joint body 101. The electric heating wire 12 is coiled and buried in the pipe joint body 101. Base end portions of the two connector pins 13 are embedded in the pipe joint body 101 at respective ends thereof, and are connected to respective ends of the electric heating wire 12. Upper end portions of the connector pins 13 protrude from the cylindrical outer wall of the pipe joint body 101. Cylindrical protrusions 16 are formed on the outer wall of the pipe joint body 101 to surround the connector pins 13.

The plastic pipes 2A and 2B and the plastic joint 100 are connected in the following manner. The plastic pipes 2A and 2B are inserted into the plastic pipe joint 100 from both ends until they reach the annular inside rim 14. Then connectors (not shown) are engaged with the connector pins 13 provided at both ends of the plastic pipe joint 100, respectively. Current is applied through the connectors to the electric heating wire 12 in the plastic pipe joint 100 so that heat is generated by the heating wire 12. The heat melts the cylindrical inner wall of the plastic pipe joint 100 and the cylindrical outer walls of the inserted parts of the plastic pipes 2A and 2B, so that the pipes 2A and 2B are welded to the joint 100. Thereafter, the connectors are removed from the plastic pipe joint 100.

In the conventional pipe connecting operation of FIG. 6, the application of current is controlled in the following manner. First, the ambient temperature and the initial temperature of the plastic pipe joint 100 are measured. Then, a period of time for application of current to the heating wire 12 in the plastic pipe joint 100 (hereinafter referred to as "a current application time period") is determined according to the measured temperatures. Current is then applied to the heating wire for the current application time.

One example of the relationship between the current application time period and the initial temperature is shown in FIG. 7. As is apparent from FIG. 7, when the initial temperature ranges from −10° C. to 0° C., the current application time period is 120 sec.; when the initial temperature ranges from −10° C. to 0° C., the current application time period is 110 sec.; when the initial temperature ranges from 10° C. to 20° C., the current application time period is 100 sec.; when the initial temperature ranges from 20° C. to 30° C., the current application time period is 90 sec.; and when the initial temperature ranges from 30° C. to 40° C., the current application time period is 80 sec.

The above-described current application control suffers from the disadvantages that it is rather difficult to determine a suitable current application time period for two reasons. First, the current application time period should be determined not only from the initial temperature of the plastic pipe joint but also from the size of the plastic pipe joint and the type of plastic material. Second, the variation in electrical resistance of the heating wire or in the current or voltage applied to the heating wire will offset the temperature and require changes in the current time period.

U.S. Pat. No. 4,684,417 discloses another conventional plastic pipe joint in which a recess is provided in a sleeve of the plastic pipe joint. An electric current is applied to the sleeve, and upon reaching welding temperature, the material of the sleeve expands into the recess. The change of pressure due to expansion of the material or the change of temperature of the material is detected so that the current application time period maybe controlled. However, the shape of expansion of the material is not definite and the detection of temperature is apt to be subjected to the influence of an ambient temperature. Accordingly, the detection is not stable.

SUMMARY OF THE INVENTION

Accordingly, an object of the present invention is to provide a plastic pipe joint connected to plastic pipes by electrical fusion welding in which the current application time period need not be determined.

A further object of the present invention is to provide a plastic pipe joint connected to plastic pipes by electrical fusion welding in which the appropriate time for removal of the fusion plugs may be displayed.

Yet another object of the present invention is to provide a plastic pipe joint connected to plastic pipes by electrical fusion welding in which both the time at which the application of current is suspended and at which the plugs can be disconnected from the plastic pipe joint may be signaled to an operator by acoustic means.

A further object of the present invention is an improved joint for connecting plastic pipes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

To achieve the foregoing and other objects, and in accordance with the purposes of the invention as embodied and broadly described herein, there is provided a plastic socket pipe joint assembly for joining sections of plastic pipe comprising a plastic socket joint body having an inner surface and an outer surface, the inner surface receiving the ends of the sections of the plastic pipe; an electric heating wire embedded near the inner surface of the plastic socket joint body, the electric heating wire being coiled more tightly at the ends of the joint body than at the middle thereof; a first connector pin electrically connected to one end of the heating wire and a second connector pin electrically connected to the other end of the heating wire, current supply means adapted to be connected to the first and second connector pins to enable a current to flow: a first recess provided in the joint body proximate the first connector pin and a second recess provided in the joint body proximate the second connector pin, the first and second recesses disposed near the electric heating wire; temperature sensing means provided in each of the first and second recesses, respectively, for sensing the temperature of the plastic joint body proximate the first and second connector pins; and control means operatively connected to the temperature sensing means for disabling the current supply means to discontinue the supply of current to the first and second connector pins when the plastic socket pipe joint body has reached a predetermined temperature.

In accordance with the purposes of the invention, there is further provided an assembly for joining the ends of sections of plastic pipe by thermal fusion comprising a substantially cylindrical plastic socket joint body having a first end and a second end, the first end receiving an end of one of the sections of plastic pipe and the second end receiving an end of the other section; an electric heating wire embedded in the cylindrical inner surface of the joint body, the electric heating wire being coiled more tightly at the first and second ends of the joint body than at the middle thereof, a plurality of connector pins including a first connector pin electrically connected to the first end of the electric heating wire and a second connector pin electrically connected to the second end of the electric heating wire; a plurality of recesses including a first recess disposed in the joint body proximate the first connector pin and a second recess disposed in the joint body proximate the second connector pin; current supply means for providing a current to the electric heating wire to thermally fuse the plastic socket joint body to the ends of the sections of plastic pipe; and temperature sensing means provided in each of the first and second recesses, respectively, without clearance therebetween for sensing the temperature at the bottom of each of the first and second recesses.

According to the present invention, the temperature at the bottom of the recess of the plastic socket pipe joint is detected by the thermocouple, and the control of the current application to the plastic socket pipe joint is carried out by using the detected temperature. Accordingly, it is not necessary to determine the troublesome current application time period, and exact and stable connection can be attained. Further, since the thermocouple closely contacts the recess, a welded material does not expand into the recess after the thermocouple is inserted into the hole. Accordingly, the thermocouple always detects the temperature of welded portion at the bottom of the recess of the plastic socket pipe joint, and the accuracy of controlling the current application can be attained. Also, the present invention provides suitable dimensions and relative relationship of the plastic socket pipe joint body, the heating wire and the recess hole.

BRIEF DESCRIPTION OF THE DRAWINGS

In the accompanying drawings:

FIG. 4 is a sectional view showing a plastic branch pipe joint mounted on a plastic pipe and welded thereto according to the present invention;

FIG. 5 is a sectional view taken along line A—A in FIG. 4;

DETAILED DESCRIPTION

One example of a plastic socket pipe joint according to the present invention will be described with reference to FIG. 1.

Figure 1:
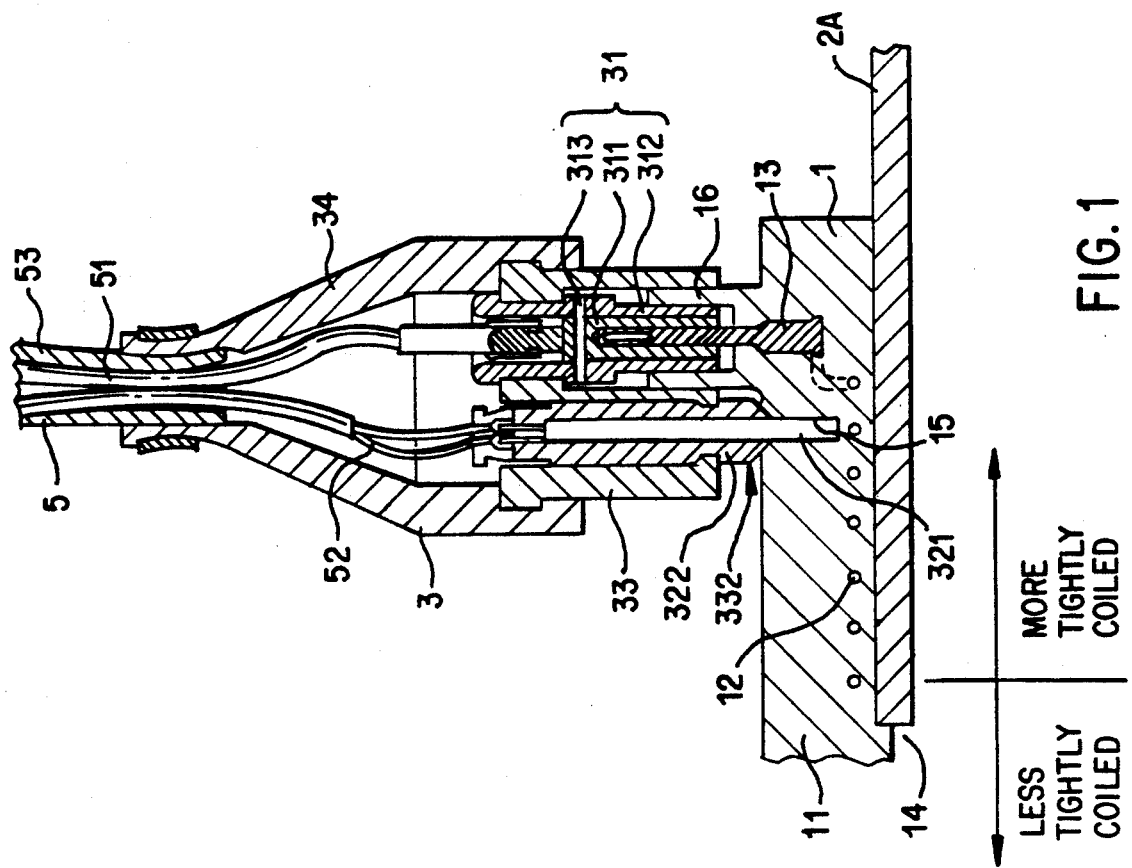
FIG. 1 is a sectional view showing a plastic socket pipe joint into which a plastic pipe is inserted and welded thereto according to the present invention.

As shown in FIG. 1, a fusion welding plug 3 is coupled to one end portion of a plastic socket pipe joint 1 to weld plastic pipe 2A thereto. The plastic pipe 2A is substantially the same as the plastic pipe shown in FIG. 6. The plastic socket pipe joint 1 is similar to the plastic pipe joint shown in FIG. 6, in that it comprises a socket pipe joint body 11, an electric heating wire 12, and two connector pins 13. The electric heating wire 12 is coiled more tightly at the ends of the joint body than at the middle thereof and buried in the inner wall of socket pipe joint body 11. The connector pins 13 are embedded in the socket pipe joint body 11. Cylindrical protrusions 16 are formed on the outer wall of the pipe joint body 11 and surround the connector pins 13. The plastic socket pipe joint 1 is symmetrical about a first end of the pipe joint opposite to the end thereof to which fusion plug 3 is coupled so that the plastic socket pipe joint 1 comprises two identical portions having identical elements.

Figure 6:
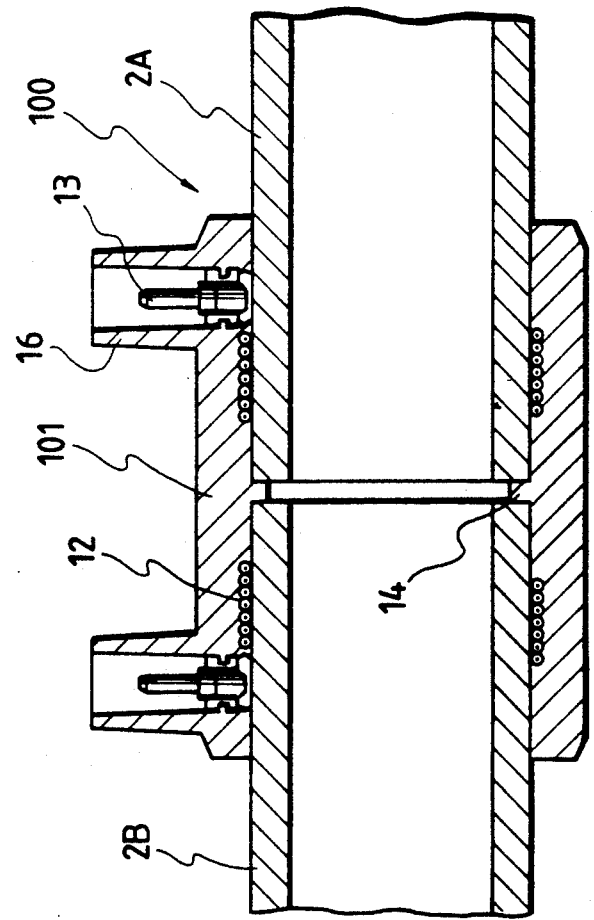
FIG. 6 is a sectional view showing a conventional plastic pipe joint into which plastic pipes are inserted and welded thereto.

The plastic socket pipe joint 1 is different from that of FIG. 6 in that each end is formed with a recess 15 near cylindrical protrusion 16. The recess 15 receives a temperature measuring means such as a thermocouple, shown generally at 332. Thermistors or resistance bulbs may be used instead of thermocouples. The thermocouple 332 comprises a thermocouple body 321, which is engaged with the recess 15 without making a space between the thermocouple body and the recess 15, and a thermocouple case 322 covering the thermocouple body 321. The distance between the bottom of the recess 15 and an outer periphery, opposite to the bottom, of the electric heating wire 12 is made slightly larger than that between the inner surface of the socket pipe joint body 11 and an outer periphery, opposite to the inner surface, of the wire 12. If the distance is much larger, the measured temperature is near the atmospheric temperature as in the prior art, so that the accuracy of controlling pipe connection becomes inferior. On the other hand, if the distance is much smaller, the measured temperature is near the temperature of the electric heating wire and is different from the average temperature of a fused portion, and further the electric heating wire may contact the thermocouple when fusion occurs. Thus it is not preferable to decrease the distance excessively. It is preferable that the distance between the bottom of the blind hole 15 and the outer periphery of the electric heating wire 12 is in the range of 0.6–1.2 mm, the outer diameter of the electric heating wire is in the range of 0.4–0.6 mm, and the distance between the inner surface of the socket pipe joint body 11 and the outer periphery of the electric heating wire 12 is in the range of 0.5–0.6 mm.

The fusion welding plug 3 will be described with reference to FIG. 1. The plug 3 is engaged with the connector pin 13 and the recess 15 of the plastic socket pipe joint. The plug comprises a connector which is shown generally at 31, and which is engaged with the connector pin 13. The connector comprises a connector bushing 311 having a through hole into which an end of the connector pin 13 is inserted, a bushing case 312 covering the connector bushing 311, and a connecting pin 313 connecting the connector bushing 311 to the bushing case 312. Each of the plugs further comprises a thermocouple 332, a holder 33 which holds the thermocouple 32 and the connector 31 together, and a cap 34 coupled to the holder. The holder 33 holds the connector 31 and the thermocouple 332 in such a manner that the connector 31 and the thermocouple 332 are parallel to each other. The connector 31 and the thermocouple 332 are detachably mounted in the holder 33. More specifically, the holder 33 holds the connector 31 and the upper and middle portions of thermocouple 332 together.

The fusion welding plug 3 is connected to a cord 5 comprising a power cable 51, lead wires 52, and protective tubes 53 covering the power cable 51 and the lead wires 52. The power cable 51 is connected to the upper end of the connector bushing 311, and the lead wires 52 are connected to the thermocouple body 321. The upper end portion of the cap 34 is fitted around the protective tubes 33. The lower end portion of the cap 34 is fitted on the upper end portion of the holder 33 and covers the connection between the power cable 51 and the connector bushing 311 and the connection between the thermocouple body 321 and the lead wires 52.

Now, a method of welding the plastic pipes 2A to the plastic socket pipe joint 1 will be described. First, the plastic pipes 2A (only one shown) are inserted into the plastic socket pipe joint 1 from both ends until they reach the annular inner rim 14 formed on the inner wall of the pipe joint 1. A fusion welding plug 3 is then coupled to each end of the plastic socket pipe joint 1. By this operation, the connectors 31 of the plugs 3 are engaged with the connector pins 13 provided at the ends of the pipe joint. The thermocouples 332 are inserted into the recesses 15 so that the thermocouples closely contact the recesses and the lower ends of the thermocouples 332 contact the bottoms of the recesses 15. Current is then controllably applied to the connector pins 13.

Figure 2:
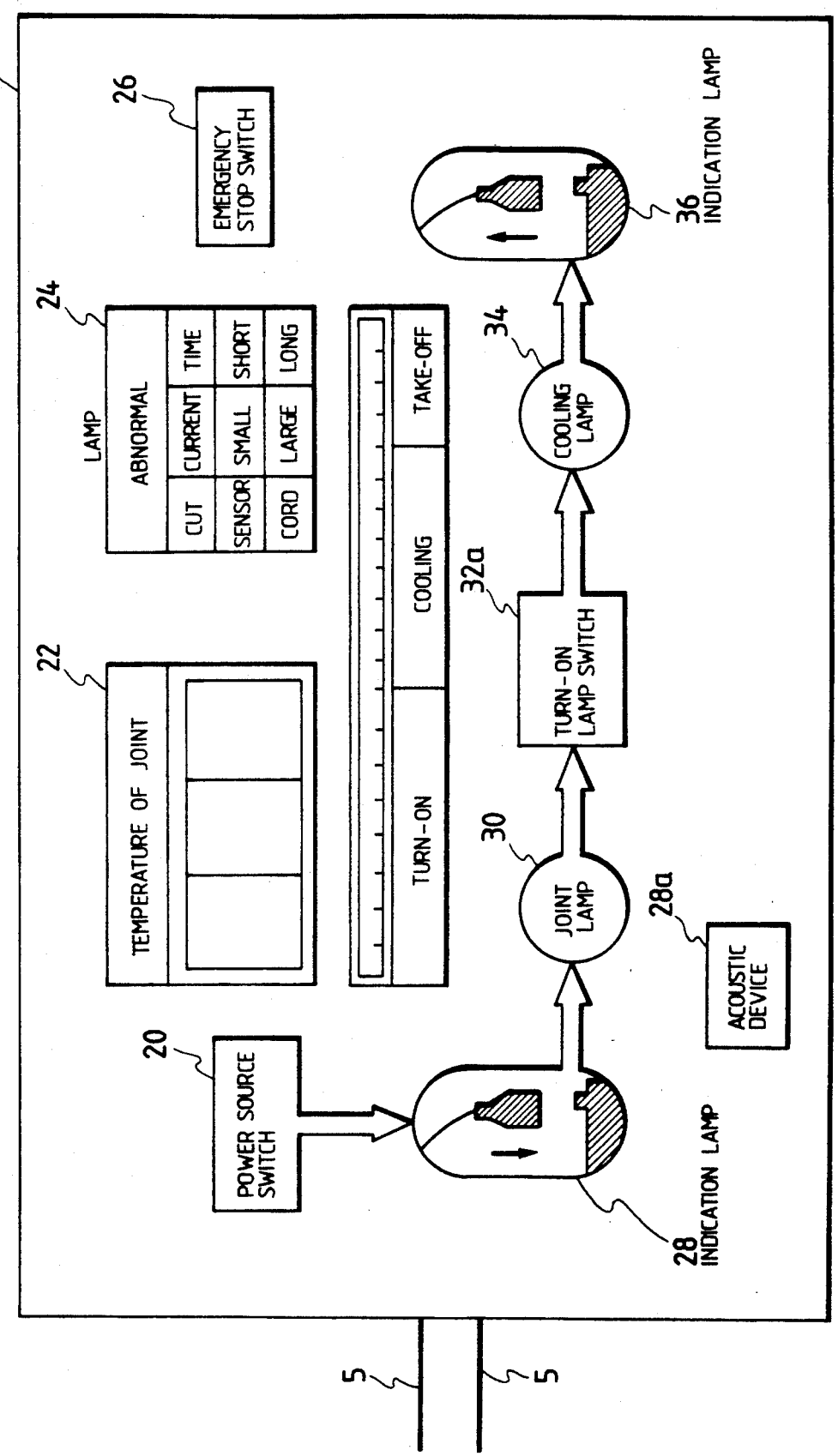
FIG. 2 is a front view of a control device employed in welding either plastic socket pipe joint or a plastic branch pipe joint to a plastic pipe according to the present invention.
Figure 7:
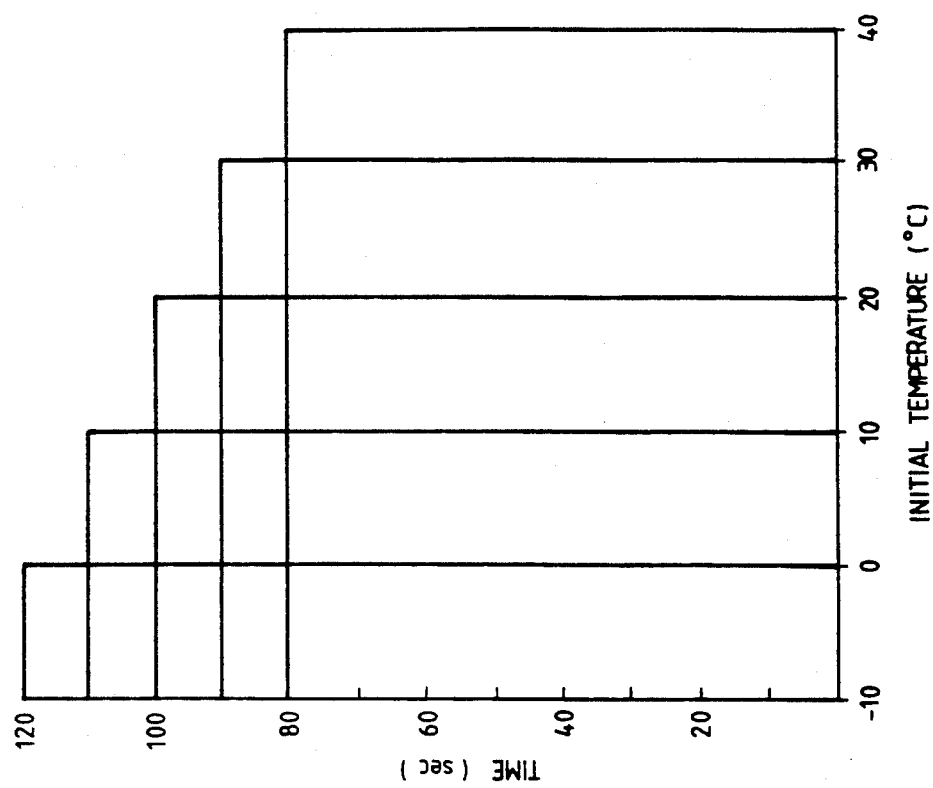
FIG. 7 is a graphical representation indicating initial temperature vs. current application time for welding the conventional plastic pipe joint to the plastic pipes of FIG. 6.

Current application control will be described with reference to FIGS. 2 and 3. FIG. 2 is a front of a control device 4 that is connected to the cords 5 that are electrically connected to the fusion welding plugs 3. A power switch 20 of the control device 4 is turned on to apply current to the electric heating wire 12 in the plastic socket pipe joint 1. This causes the heating wire to generate heat to melt the cylindrical inner wall of the plastic socket pipe joint 1 and the outer walls of the inserted parts of the plastic pipes 2A. At the same time, the temperature rise of the plastic socket pipe joint 1 is continuously measured with the thermocouple 332 of the fusion welding plug 3 and is displayed on the control device body 4 on temperature readout device 22.

The maximum value to which the temperature of the plastic socket pipe joint 1 may be increased by the heat generated by the heating wire 12 is preset in the control device 4. For example, the predetermined value for the temperature of the plastic socket pipe joint 1 is suitably about 130° C. in the case where the plastic socket pipe joint 1 and the plastic pipes 2A are made of middle-density polyethylene When the temperature of the plastic socket pipe joint 1 is increased to the predetermined value by the heat generated by the heating wire, the power switch 20 is turned off to suspend application of current and a cooling lamp 34 is turned on. The control device may be designed so that sound generating means such as a buzzer 28a is operated to indicate the suspension of the application of current to the plastic socket pipe joint 1. After the application of current is suspended, the plastic socket pipe joint and the plastic pipes are welded together but must be cooled down.

After the suspension of the application of current to the heating wire in the plastic socket pipe joint 1, the temperature of the plastic socket pipe joint 1 is continuously measured and displayed. In this connection, the temperature at which the fusion welding plugs 3 can be removed from the plastic socket pipe joint 1 is also predetermined. More specifically, a temperature at which the welds of the plastic socket pipe joint 1 and the plastic pipes 2A are not adversely affected by external forces is predetermined. When the temperature of the plastic socket pipe joint 1 reaches the predetermined value, sound generating means such as a buzzer 28a is operated to inform the operator that the fusion welding plugs 3 may be removed from the plastic socket pipe joint 1. The predetermined temperature is suitably about 60° C. in the case where the plastic socket pipe joint 1 and the plastic pipes 2A are of middle-density polyethylene.

Figure 3:
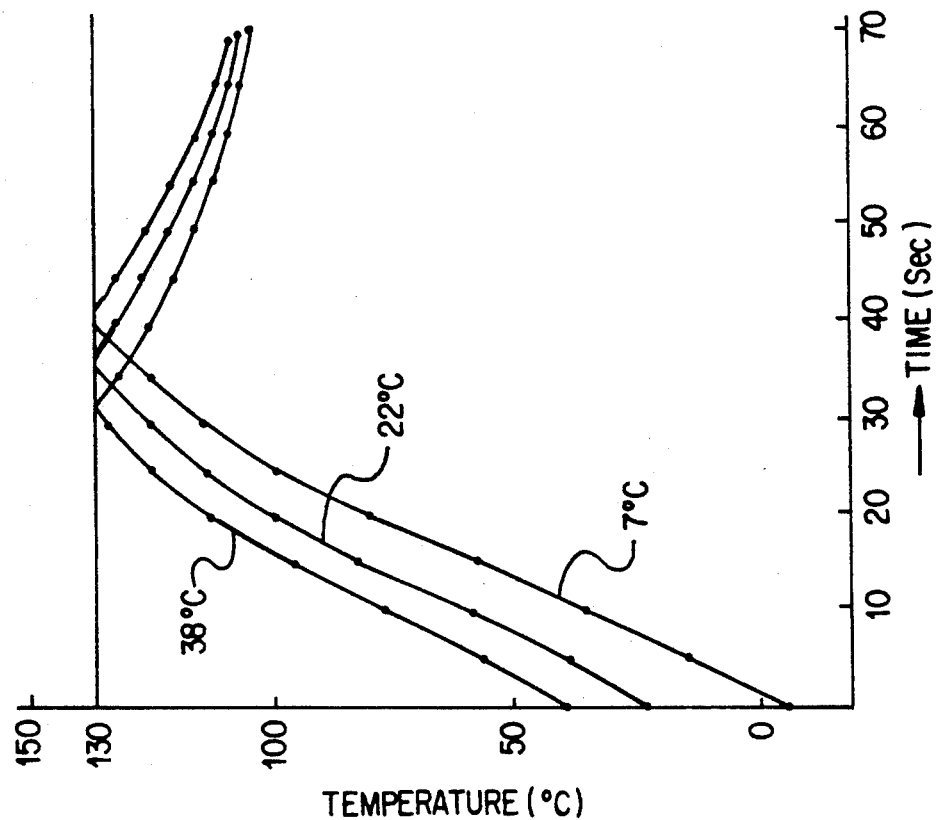
FIG. 3 is a graphical representation indicating the variations of temperature of the plastic socket pipe joint after application of current to an electric heating wire embedded therein.

FIG. 3 indicates the variations in temperature of the plastic socket pipe joint 1 in the cases where, in welding the plastic pipes 2A to the plastic socket pipe joint 1, the initial ambient temperatures were −7° C., 22° C. and 38° C., respectively.

The changes in the display on the display panel of the control device 4 will be described with reference to FIG. 2 in more detail. When the power switch 20 of the control device body 4 is turned on, an instruction lamp for requesting the operator to connect the fusion welding plugs 3 to the plastic socket pipe joint 1 is turned on. Upon completion of the connection of the plugs 3, a connection indication lamp 28 is turned on. If, in this case, the thermocouples 332, the electric heating wire 12, the power cables 51 and/or the lead wires 52 are broken, then a wire breakage lamp in an abnormal condition indicating lamp group 24 is turned on, but the connection lamp 28 is not turned on.

After the connection lamp 28 is turned on, a current application lamp/switch 32a is depressed. The current application lamp/switch 32a remains turned on until the application of current is suspended. If, in this operation, the current applied is excessively large (or small), then an abnormal condition indicating lamp 24 adapted to indicate the fact that the current applied is excessively large (or small) is turned on.

When the application of current is automatically suspended, the current application lamp/switch 32a is turned off, and a cooling lamp 34 is turned on. When the temperature of the plastic socket pipe joint is decreased to a predetermined value at which the fusion welding plugs 3 can be disconnected from the pipe joint, the cooling lamp 34 is turned off while another removal indication lamp 36 is turned on to request the operator to disconnect the plugs 3 from the plastic socket pipe joint 1. An acoustic device (buzzer) 28a is also activated to alert the operator. When the period of time for which the current application lamp/switch 32a or the cooling lamp 34 is kept turned on is extremely short or long, an abnormal condition indicating lamp is turned on to inform the operator of the abnormal condition. When any one of the abnormal condition indicating lamps is turned on, an emergency stop switch 26 may be depressed to disconnect the control device body 4 from the power source.

A joint temperature display lamp 22 continuously indicates the temperature of the bottom of the recess 15 in the plastic socket pipe joint 1 which is measured by the thermocouple 332 of the fusion welding plug.

Each of the current application lamp/switch 32A, cooling lamp 34 and removal indication lamp 36 lamps indicates for instance 0%, 10%, 20% ... 100% in a bar graph mode. For instance in the case where the temperature of the plastic socket pipe joint is 20° C. before current is applied thereto, the predetermined temperature at which the application of current should be suspended is 130° C. At a time during the application of current when the temperature of the plastic socket pipe joint is 75° C., the current application lamp/switch 32A lamp indicates 50% to reflect that the pipe joint has been heated to a temperature that is 50% of the predetermined temperature. Similarly, in the cooling mode, if the predetermined temperature at which the application of current should be suspended is 130° C. and the fusion welding plugs can be removed from the plastic socket pipe joint at 60° C., when the temperature of the plastic socket pipe joint is 100° C., the bar graph of the cooling lamp 34 indicates 42.9%

The above-described joint temperature display lamp 32, and the current application lamp/switch 32A, cooling lamp 34 and removal indication lamp 36 indicate the degree of advance of the current application, the degree of advance of the cooling operation, and the percentage of possibility of removing of the fusion welding plugs. If only a pilot lamp indicating the application of current were used, it would be impossible to tell when the application of current has ended. This difficulty is eliminated by the provision of the current application lamp 30 from which it can be determined approximately when the application of current has ended.

Now, a plastic pipe joint in the form of a branch which is adapted to be connected to a plastic pipe will be described with reference to FIGS. 4 and 5. The details of the fusion welding plug 3 and the control device 4 are the same as discussed above with respect to FIG. 1.

As shown in FIGS. 4 and 5, the plastic pipe 2C has a through-hole 21C that extends from the outer wall to the inner wall. The plastic branch pipe joint 6 comprises a plastic branch pipe joint body 61, an electric heating wire 62 and two connector pins 63. The plastic branch pipe joint body 61 is made up of a saddle part 611 in the form of a half cylinder, and a cylindrical body part 612 that extends from the periphery of a through-hole 6111 formed at the center of the saddle part 611 in such a manner that the cylindrical body part 612 protrudes radially outwardly of the saddle part 611. Both side edges of the saddle part 611 extend radially outwardly to form a pair of protrusions 6112 which are used to temporarily fix the branch pipe joint body 61 to the plastic pipe 2C. The cylindrical body part 612 has engaging means, for instance a female thread 6121, formed in the inner wall of the upper portion of the cylindrical body part 612 so that the cylindrical body part 612 is closed with a plug 7 engaged with the female thread 6121. The cylindrical body part 612 may have a branch pipe 6122 at the middle as shown in FIG. 4, to which a pipe (not shown) is connected.

The electric heating wire 62 is coiled and buried in the inner wall of the saddle part 611. The two connector pins 63 are formed in the saddle part 611 in such a manner that their base ends are connected to respective ends of the electric heating wire 62, and their upper end portions protrude from the outer wall of the saddle part 62. As in the above-described plastic socket pipe joint of FIG. 1, each of the connector pins 63 is surrounded by a cylindrical protrusion 6113, and a blind hole 6114 for receiving a thermocouple is formed near the cylindrical protrusion 6113.

Now, a method of welding the plastic branch pipe joint 6 to the plastic pipe 2C will be described. First, the saddle part 611 of the plastic branch pipe joint 6 is temporarily mounted on the plastic pipe 2C in such a manner that the through-hole 6111 of the saddle part 611 is in alignment with the through-hole 21C of the plastic pipe 2C.

The remaining steps in the method are the same as those in the above-described method of welding the plastic socket pipe joint 1 to the plastic pipes 2A of FIG. 1. The fusion welding plugs 3 are then coupled to the end portions of the plastic branch pipe joint 6. By this operation, the connectors 31 of the plugs 3 are engaged with the connector pins 63 formed at the ends of the pipe joint 6. Temperature measuring means, such as a thermocouple 332, is inserted into each recess 6114 so that the lower end of the thermocouple is in contact with the bottom of the recess.

Current is then applied through the plugs 3 to the electric heating wire 62 to cause the wire 62 to generate heat which melts the cylindrical inner wall of the plastic socket pipe joint 6 and the outer walls of the inserted parts of the plastic pipes 2C. At the same time, the temperature rise at the bottom of the recess is continuously measured with the thermocouples 332 of the plugs 3. When the temperature of the branch pipe joint 6 reaches a predetermined value, the application of current to the electric heating wire 62 is suspended and acoustic means such as a buzzer is activated. Upon suspension of the application of the current, the plastic branch pipe joint and the plastic pipes which have been welded together, are allowed to cool down.

After the suspension of the application of current, the temperature of the plastic branch pipe joint 6 is continuously measured with the thermocouples 332. When the temperature of the branch pipe joint 6 is decreased to a predetermined value to which the plugs 3 can be removed from the branch pipe joint 6, acoustic means such as a buzzer is operated to inform the operator of the fact that the plugs 3 can be disengaged from the plastic branch pipe joint 6.

As is apparent from the above description, the method of the invention provides for welding the plastic pipe joint to the plastic pipe without the need for the determination or estimation of the current application time. Furthermore, in the method of the invention, the suitable time for the removal of the fusion welding plugs is displayed, which prevents the problem of removing the plugs too early or too late. Moreover, in the method of the invention, acoustic means signal the operator when the applicaton of current is suspended or when the plugs can be disconnected from the plastic pipe joint, and therefore it is unnecessary for the operator to watch the control device body at all times. In addition, since the operator is signaled when the application of current is suspended, he can determine approximately when the plugs can be disconnected from the plastic pipe joint. Furthermore, as the fusion welding plug engages with the connector and the thermocouple as one unit, the connector and the thermocouple can be engaged with the plastic pipe joint simultaneously. Finally, the provision of the thermocouples contacting the recesses at the bottom thereof makes it possible to quickly detect the temperature rise at the bottom of the recess.

Additional advantages in modifications will readily occur to those skilled in the art. The invention in its broader aspects is, therefore, not limited to the specific details, representative apparatus and the illustrative examples shown and described. Accordingly departures may be made from such details without departing from the spirit or scope of the general inventive concept as defined by the dependent claims and their equivalence.

What is claimed is:

1. A plastic socket pipe joint assembly for joining sections of plastic pipe, comprising:
   a plastic socket joint body having an inner surface and an outer surface, said inner surface receiving the ends of the sections of plastic pipe;
   an electric heating wire embedded near the inner surface of said plastic socket joint body, said electric heating wire being coiled more tightly at the ends of said joint body than at the middle thereof;
   a first connector pin electrically connected to one end of the electric heating wire and a second connector pin electrically connected to the other end of the electric heating wire;
   current supply means adapted to be connected to the first and second connector pins to enable a current to flow through said electric heating wire;
   a first recess provided in said joint body proximate the first connector pin and a second recess provided in said joint body proximate the second connector pin, said first and second recesses being disposed near said electric heating wire;
   temperature sensing means provided in each of the first and second recesses, respectively, for sensing the temperature of the joint body proximate the first and second connector pins;
   a first fusion welding plug engaging the first connector pin and the first recess and a second fusion welding plug engaging the second connecting pin and the second recess; and
   control means operatively connected to the temperature sensing means comprising means for disabling the current supply means to discontinue the supply of current to the first and second connector pins when said joint body has reached a first predetermined temperature, and means for indicating when the joint body has reached a second predetermined temperature, after the supply of current has been discontinued, where the second predetermined temperature is defined by the temperature at which the fusion welding plugs may be removed from the plastic joint body.

2. The plastic socket pipe joint assembly as claimed in claim 1, wherein said electric heating wire has a first outer surface opposing a bottom of said first recess and a second outer surface opposing the inner surface of said socket joint body, and further wherein a first distance between the bottom of said first recess and the first outer surface of said electric heating wire is slightly larger than a second distance between the inner surface of said socket joint body and the second outer surface of said electric heating wire.

3. The plastic socket pipe joint assembly as claimed in claim 2, wherein said first distance is in the range of 0.6–1.2 mm.

4. A plastic branch pipe joint comprising:
   a plastic branch pipe joint body including a substantially semi-cylindrical saddle part having a through-hole formed near the outer periphery thereof;
   a cylindrical body extending from the outer periphery of said through-hole and protruding radially outwardly of said saddle part, said cylindrical body having engaging means at a radially outer surface thereof;
   an electric heating wire buried in an inner surface of said saddle part;
   a plurality of connector pins embedded in said saddle part including a first connector pin and a second connector pin, each of the first and second connector pins having a lower end portion connected to an end of said electric heating wire and an upper end portion protruding from the radially outer surface of said saddle part;
   current supply means adapted to be connected to the first and second connector pins to enable a current to flow between the first and second connector pins through said electric heating wire;
   a first recess provided in the saddle part proximate the first connector pin and a second recess provided in the middle part proximate the second connector pin, said first and second recesses being disposed near said electric heating wire;
   temperature sensing means provided in said saddle part proximate each of said connector pins for sensing the temperature of said saddle part;
   a first fusion welding plug engaging the first connector pin and the first recess and a second fusion welding plug engaging the second connecting pin and the second recess; and
   control means operatively connected to the temperature sensing means comprising means for disabling the current supply means to discontinue the supply of current to the first and second connector pins when said joint body has reached a first predetermined temperature, and means for indicating when the joint body has reached a second predetermined temperature, after the supply of current has been discontinued, where the second predetermined temperature is defined by the temperature at which the fusion welding plugs may be removed from the plastic joint body.

5. An assembly for joining sections of plastic pipe by thermal fusion comprising:
   a substantially cylindrical plastic socket joint body having first and second end means for receiving, respectively, an end of a section of plastic pipe and an end of a section of another plastic pipe;
   an electric heating wire embedded in the cylindrical inner surface of the plastic socket joint body, said electric heating wire being coiled more tightly at the first and second ends of the joint body than at the middle thereof;

a first connector pin electrically connected to the first end of said electric heating wire and a second connector pin electrically connected to the second end of said electric heating wire, the first and second connector pins adapted for receiving a current supply means;

a first recess disposed in said joint body proximate said first connector pin and a second recess disposed in said joint body proximate said second connector pin, each recess shaped to receive a temperature sensing means without clearance therebetween;

current supply means, engageable with said first and second connector pins, for supplying current to said electric heating wire to heat the inner surface to the melting temperature of the plastic material available at the inner surface;

temperature sensing means, engageable with the first recess without clearance therebetween, for sensing the temperature at the bottom of the first recess and for preventing expansion of the available material into the bottom of the recess; and control means, operatively connected to the temperature sensing means, including means for disabling the current supply means to discontinue the supply of current when said joint body has reached a first predetermined temperature, and means for indicating when the joint body has reached a second predetermined temperature, after the supply of current has been discontinued, the second predetermined temperature being defined by the temperature at which the fusion welding plugs may be removed from the plastic joint body.

6. An assembly for joining sections of pipe by thermal fusion comprising:

a joint body including a first end having means for receiving a section of pipe of a plastic material, a second end having means for receiving another section of pipe of the plastic material, an inner surface disposed to be proximate the sections of pipe when the first and second ends are receiving the sections of pipe, means for receiving a current to heat the inner surface to a melting temperature of a plastic material available at the inner surface, and a recess, having a bottom, shaped to receive a means for sensing temperature at the bottom;

current supply means for supplying current to the means for receiving a current to heat the inner surface to the melting temperature of the plastic material available at the inner surface;

temperature sensing means, engageable with the recess, for sensing the temperature at the bottom of the recess, the temperature sensing means being disposed to be detachable from the joint body after being engaged by the recess and the means for receiving a current has melted the available material, the temperature sensing means being mounted on a plug engageable with the joint body; and control means, operatively connected to the temperature sensing means, including means for disabling the current supply means to discontinue the supply of current when the joint body has reached a first predetermined temperature, and means for indicating when the joint body has reached a second predetermined temperature, after the supply of current has been discontinued, the second predetermined temperature being defined by the temperature at which the fusion welding plugs may be removed from the plastic joint body.

7. The assembly of claim 6, wherein the recess is shaped to receive a temperature sensing means having means for preventing expansion of the available material into the bottom of the recess.

8. The assembly of claim 6, wherein the recess is shaped to receive a temperature sensing means having a thermocouple, disposed to be at the bottom of the recess when the plug is engaged with the joint body, conforming to the recess to prevent expansion of the available material into the bottom of the recess.

9. The assembly of claim 8, wherein the means for receiving a current includes an electric heating wire embedded in the joint body.

10. An assembly for joining sections of pipe by thermal fusion comprising:

a joint body including a first end having means for receiving a section of pipe of a plastic material, a second end having means for receiving another section of pipe of the plastic material, an inner surface disposed to be proximate the sections of pipe when the first and second ends are receiving the sections of pipe, means for receiving a current to heat the inner surface to a melting temperature of a plastic material available at the inner surface, and a recess, having a bottom, shaped to receive a means for sensing temperature at the bottom;

current supply means for supplying current to the means for receiving a current to heat the inner surface to the melting temperature of the plastic material available at the inner surface;

temperature sensing means, engageable with the recess, for sensing the temperature at the bottom of the recess, the temperature sensing means being disposed to be detachable from the joint body after being received by the recess and the means for receiving a current has melted the available material, the temperature sensing means being mounted substantially parallel to a connector on a plug engageable with the joint body, the connector disposed to be in electrical contact with the current receiving means when the plug is engaged with the joint body; and control means, operatively connected to the temperature sensing means, including means for disabling the current supply means to discontinue the supply of current when the joint body has reached a first predetermined temperature, and means for indicating when the joint body has reached a second predetermined temperature, after the supply of current has been discontinued, the second predetermined temperature being defined by the temperature at which the fusion welding plugs may be removed from the plastic joint body.

11. The assembly of claim 10, wherein the recess is shaped to receive a temperature sensing means having means for preventing expansion of the available material into the bottom of the recess.

12. The assembly of claim 10, wherein the temperature sensing means includes a thermocouple, and the recess is shaped to receive the temperature sensing means with the thermocouple disposed to be at the bottom of the recess when the plug is engaged with the joint body and to conform to the temperature sensing means to prevent expansion of the available material into the bottom of the recess.

13. The assembly of claim 12, wherein the means for receiving a current includes
an electrical heating wire embedded in the joint body.

14. An assembly for joining sections of pipe of a plastic material by thermal fusion comprising:
a substantially cylindrical plastic socket joint body having a first and second end, the first end having means for receiving an end of one of the sections of pipe and the second end having means for receiving an end of another of the sections of pipe;
an electric heating wire embedded in the cylindrical inner surface of the plastic socket joint body, the electric heating wire being coiled more tightly at the first and second ends of the joint body than at the middle thereof;
a first connector pin electrically connected to the first end of the electric heating wire and a second connector pin electrically connected to the second end of the electric heating wire, the first and second connector pins adapted for receiving a current supply means;
a first recess disposed in the joint body proximate the first connector pin and a second recess disposed in the joint body proximate the second connector pin, each recess shaped to receive a temperature sensing means without clearance therebetween for sensing the temperature at the bottom of each of the recesses and for preventing expansion of the available material into the bottom of the recess;
current supply means for supplying current to the electric heating wire to heat the inner surface to the melting temperature of the plastic material available at the inner surface;
temperature sensing means, engageable with the recesses, for sensing the temperature at the bottom of the recesses, the temperature sensing means being disposed to be detachable from the joint body after being engaged by the recesses and the electric heating wire has melted the available material, the temperature sensing means being mounted on plugs engageable with the joint body; and
control means, operatively connected to the temperature sensing means, including
means for disabling the current supply means to discontinue the supply of current when the joint body has reached a first predetermined temperature, and
means for indicating when the joint body has reached a second predetermined temperature, after the supply of current has been discontinued, the second predetermined temperature being defined by the temperature at which the fusion welding plugs may be removed from the plastic joint body.

15. An assembly for joining a section of a pipe to a joint body by thermal fusion comprising:
the joint body including
a saddle frame having means for receiving a section of pipe of a plastic material including an inner surface disposed to be proximate the section of pipe when the saddle frame is receiving the section of pipe,
means for receiving a current to heat the inner surface to a melting temperature of a plastic material available at the inner surface, and
a recess, having a bottom, shaped to receive a means for sensing temperature at the bottom;
current supply means for supplying current to the means for receiving a current to heat the inner surface to the melting temperature of the plastic material available at the inner surface;
temperature sensing means, engageable with the recess, for sensing the temperature at the bottom of the recess, the temperature sensing means being disposed to be detachable from the joint body after being engaged by the recess and the means for receiving a current has melted the available material, the temperature sensing means being mounted on a plug engageable with the joint body; and
control means, operatively connected to the temperature sensing means, including
means for disabling the current supply means to discontinue the supply of current when the joint body has reached a first predetermined temperature, and
means for indicating when the joint body has reached a second predetermined temperature, after the supply of current has been discontinued, the second predetermined temperature being defined by the temperature at which the plug may be removed from the plastic joint body.

16. The assembly of claim 15, wherein the recess is shaped to receive means for preventing expansion of the available material into the bottom of the recess.

17. The assembly of claim 15, wherein the inner surface defines a hole disposed to be opposed a radial hole defined by the section of pipe.

18. The assembly of claim 15, wherein the joint body defines a cylindrical surface for receiving a second section of pipe of the plastic material.

19. The assembly of claim 15, wherein the joint body defines a cylindrical surface having means for engaging a second plug.

20. The assembly of claim 15, wherein the saddle frame extends radially outward to define a pair of protrusions.

21. The assembly of claim 15, wherein the temperature sensing means includes a thermocouple, and the recess is shaped to receive the temperature sensing means with the thermocouple disposed to be at the bottom of the recess when the plug is engaged with the joint body and to conform to the temperature sensing means to prevent expansion of the available material into the bottom of the recess.

22. The assembly of claim 21, wherein the means for receiving a current includes
an electrical heating wire embedded in the joint body.

23. The assembly of claim 22, wherein the means for receiving a current includes
an electrical heating wire embedded in the joint body.

24. An assembly for joining a section of pipe to a joint body by thermal fusion comprising:
the joint body including a saddle frame having means for receiving a section of pipe of a plastic material including an inner surface disposed to be proximate the section of pipe when the saddle frame is receiving the section of pipe, means for receiving a current to heat the inner surface to a melting temperature of a plastic material available at the inner surface, and a recess, having a bottom, shaped to receive a means for sensing temperature at the bottom;

current supply means for supplying current to the means for receiving a current to heat the inner surface to the melting temperature of the plastic material available at the inner surface;

temperature sensing means, engageable with the recess, for sensing the temperature at the bottom of the recess, the temperature sensing means being disposed to be detachable from the joint body after being engaged by the recess and the means for receiving a current has melted the available material, the temperature sensing means being mounted substantially parallel to a connector on a plug engageable with the joint body, the connector disposed to be in electrical contact with the current receiving means when the plug is engaged with the joint body; and control means, operatively connected to the temperature sensing means, comprising means for disabling the current supply means to discontinue the supply of current when the joint body has reached a first predetermined temperature, and means for indicating when the joint body has reached a second predetermined temperature, after the supply of current has been discontinued, the second predetermined temperature being defined by the temperature at which the plug may be removed from the plastic joint body.

25. The assembly of claim 24, wherein the recess is shaped to include means for preventing expansion of the available material into the bottom of the recess.

26. The assembly of claim 24, wherein the temperature sensing means includes a thermocouple, and the recess is shaped to receive the temperature sensing means with the thermocouple disposed to be at the bottom of the recess when the plug is engaged with the joint body and to conform to the temperature sensing means to prevent expansion of the available material into the bottom of the recess.

27. An assembly for joining a section of pipe to a joint body of a plastic material by thermal fusion comprising:

a saddle frame having means for receiving a section of plastic pipe, including an inner surface and first and second ends;

an electric heating wire embedded in the inner surface, the electric heating wire being coiled more tightly at the first and second ends of the frame than at the middle thereof;

a first connector pin electrically connected to a first end of the electric heating wire and a second connector pin electrically connected to a second end of the electric heating wire, the first and second connector pins adapted for receiving a current supply means;

first recess disposed in the joint body proximate the first connector pin and a second recess disposed in the joint body proximate the second connector pin, each recess shaped to receive a temperature sensing means without clearance therebetween for sensing the temperature at the bottom of each of the recesses and for preventing expansion of the available material into the bottom of the recess;

current supply means for supplying current to the electric heating wire to heat the inner surface to the melting temperature of the plastic material available at the inner surface;

temperature sensing means, engageable with the recesses, for sensing the temperature at the bottom of the recesses, the temperature sensing means being disposed to be detachable from the joint body after being engaged by the recesses and the electric heating wire has melted the available material, the temperature sensing means being mounted on plugs engageable with the joint body; and control means, operatively connected to the temperature sensing means, including means for disabling the current supply means to discontinue the supply of current when the joint body has reached a first predetermined temperature, and means for indicating when the joint body has reached a second predetermined temperature, after the supply of current has been discontinued, the second predetermined temperature being defined by the temperature at which the plug may be removed from the plastic joint body.

28. An apparatus for joining sections of pipe of a plastic material by thermal fusion comprising:

current supply means for supplying current to a means for receiving a current in a joint body to heat a surface of the joint body to a melting temperature of a plastic material available at a surface of the joint body;

a plug, engageable with the joint body, including temperature sensing means for sensing a temperature in the joint body; and control means, operatively connected to the temperature sensing means, including means for disabling the current supply means to discontinue the supply of current when the joint body has reached a first predetermined temperature, and means for indicating when the joint body has reached a second predetermined temperature, after the supply of current has been discontinued, the second predetermined temperature being defined by the temperature at which the plug may be removed from the plastic joint body.

* * * * *

UNITED STATES PATENT AND TRADEMARK OFFICE
CERTIFICATE OF CORRECTION

PATENT NO. : 5,150,923
DATED : September 29, 1992
INVENTOR(S) : Hiroshi Ohya, et. al.

It is certified that error appears in the above-indentified patent and that said Letters Patent is hereby corrected as shown below:

Claim 4, column 10, line 38, change "middle" to --saddle--.

Claim 9, column 12, line 22, change "electric" to --electrical--.

Claim 17, column 14, line 41, after "opposed" insert --to--.

Claim 23, column 14, line 63, change "22" to -- 21 --.

Claim 24, column 15, lien 28, change "comprising" to --including--.

Claim 27, column 16, line 5, before "first" insert --a--.

Signed and Sealed this

Eleventh Day of January, 1994

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,150,923
DATED : September 29, 1992
INVENTOR(S) : Hiroshi Ohya, et al It is certified that error appears in the above-indentified patent and that said Letters Patent is hereby corrected as shown below:

On the Title Page, Item [73]:

"Hitach" should read --Hitachi--.

Signed and Sealed this

Nineteenth Day of April, 1994

Attest:

BRUCE LEHMAN

*Attesting Officer*                *Commissioner of Patents and Trademarks*